No. 787,582. PATENTED APR. 18, 1905.
J. F. MALONEY.
EXTERNAL SCREW THREAD AND WORM CUTTER.
APPLICATION FILED MAY 20, 1904.
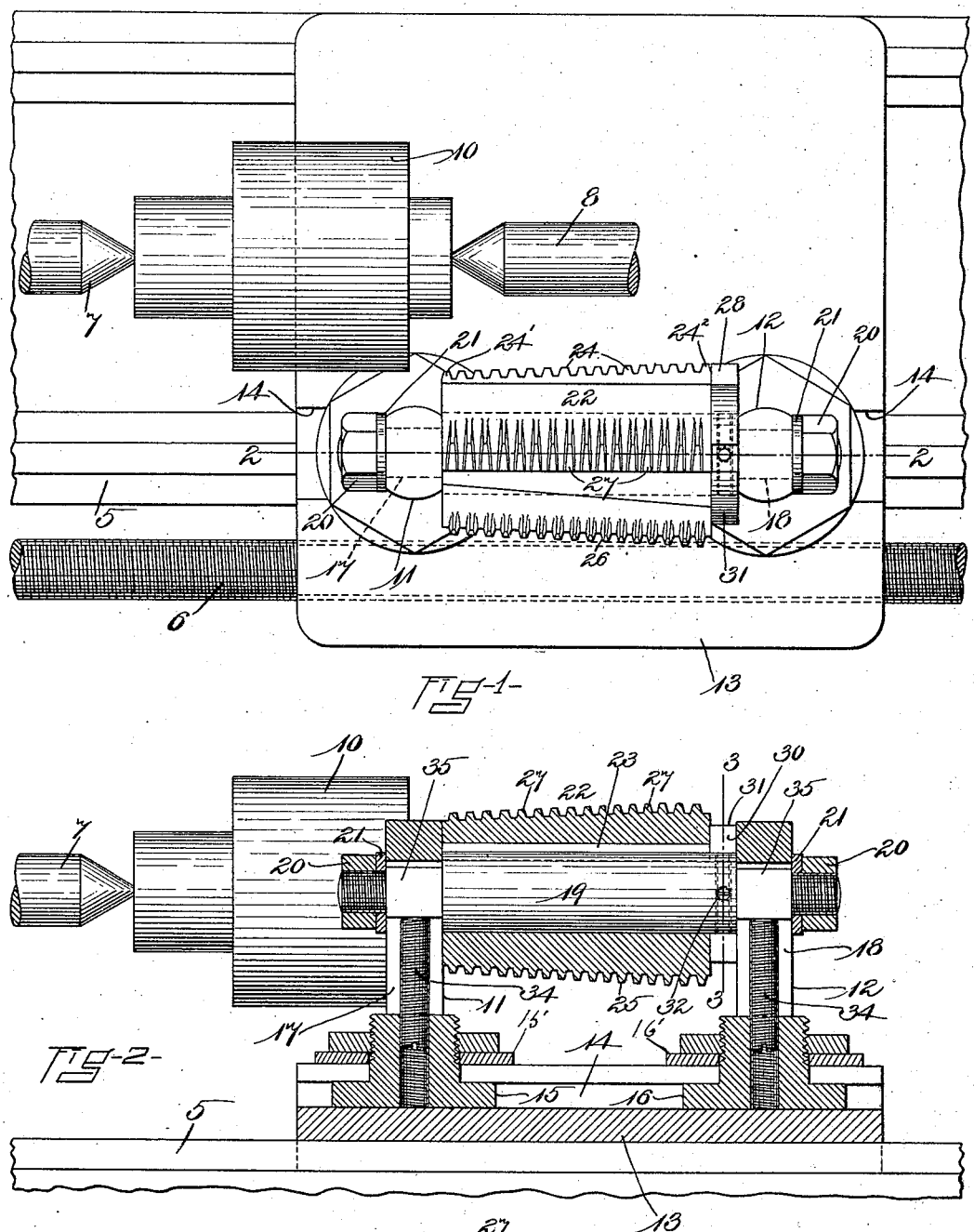

No. 787,582.

Patented April 18, 1905.

UNITED STATES PATENT OFFICE.

JAMES F. MALONEY, OF BROOKLINE, MASSACHUSETTS.

EXTERNAL SCREW-THREAD AND WORM CUTTER.

SPECIFICATION forming part of Letters Patent No. 787,582, dated April 18, 1905.

Application filed May 20, 1904. Serial No. 208,852.

*To all whom it may concern:*

Be it known that I, JAMES F. MALONEY, a citizen of the United States, residing at Brookline, in the county of Norfolk and State of Massachusetts, have invented new and useful Improvements in External Screw-Thread and Worm Cutters, of which the following is a specification.

This invention relates to a cutter to be used, preferably, in connection with an ordinary lathe for the purpose of cutting a thread or worm to the full depth, preferably in one feed of said cutter, longitudinally of the blank upon which the thread or worm is to be cut.

The object of the invention is to provide a cutter which shall combine in one bar several cutting edges constructed to cut worms or screw-threads of the same pitch.

The invention consists in the combination and arrangement of parts set forth in the following specification and particularly pointed out in the claims thereof.

Referring to the drawings, Figure 1 is a plan view of a portion of a machine-lathe, illustrating my improved cutter attached thereto. Fig. 2 is a sectional elevation taken on line 2 2 of Fig. 1. Fig. 3 is a section taken on line 3 3, Fig. 2, looking toward the left in said figure.

In the drawings, 5 is a portion of the bed of an ordinary machine-lathe; 6, the feed-screw; 7, the live-center; 8, the dead-center; 10, a bar upon which the screw-thread is to be cut, and 11 and 12 tool-posts fastened to a table 13. The table 13 is provided with a slot 14 to receive the bases 15 and 16 of the tool-posts 11 and 12, respectively, said bases being adjustably clamped to said table in said slot by nuts 15' and 16', respectively. Each of the tool-posts 11 and 12 is provided with a transverse slot 17 and 18, respectively, to receive opposite ends of a cylindrical stud 19, which is gripped to the tool-posts 11 and 12 by nuts 20 20 and washers 21 21. The stud 19 is flattened off at the ends 35 35, where it passes through the slots 17 18, to prevent the same from turning. The stud 19, together with the cutter fast thereto, as hereinafter described, may be raised and lowered by means of the adjusting-screws 34 34, said adjusting-screws 34 having screw-threaded engagement with the posts 11 and 12, respectively, and projecting upwardly from the bottom of said posts, through the interior thereof, with their upper ends bearing against the ends 35 35 of the stud 19.

My improved cutter 22 consists of a sleeve provided upon its periphery with a series of teeth 24, increasing in depth and distance from the center of the stud 19 as they extend from the left-hand end of the cutter toward the right, Figs. 1 and 2. The first tooth 24' of the series of teeth 24 is much more shallow and nearer to the median center line of the stud 19 than the final tooth $24^2$ of the series of teeth 24, said tooth $24^2$ being of the exact shape and depth which are required to impart the desired space in the finished screw-thread or worm between the threads of said screw or worm. It will also be noted that the cutting edges of the teeth 24 are located at different distances from the median line of the lathe-centers 7 and 8, as will be clearly seen by reference to Fig. 1, the tooth 24' being farther away from said median line than the tooth $24^2$ and the intermediate teeth of the series of teeth 24 gradually increasing in distance from the median line of the stud 19 and decreasing in distance from the median line of the lathe-centers 7 and 8 as they extend from the tooth 24' to the tooth $24^2$. Each cutter is preferably provided with more than one series of teeth 24, 25, 26, and 27, Fig. 3, said series of teeth being of the same pitch, so that when one series becomes dulled another may be substituted, so that threads or worms of the same pitch may be cut by turning the cutter so as to bring the teeth 24, 25, 26, or 27, respectively, into operation. Said cutter 22 is fastened by a key 23 to the stud 19.

The table 13 of the lathe is moved longitudinally thereof by the feed-screw 6, and each of the teeth 24 as they come in contact with the blank 10 cuts a thread thereon, which increases in depth as the teeth 24 extend farther from the center of the stud 19 and nearer to the center of the bar 10. The bar 10 is gripped to the live-center of the lathe by any desirable means well known to those skilled in this art.

In the use of my improved cutter it has been found that the beveled outer edges of the screw-thread or worm are left somewhat rough, and in order to make a smooth finish to said threads I provide a trimming-cutter 28, which is fastened to the right-hand end of the cutter 22 by a screw 29. Said cutter is located in a slot 30, extending transversely across a flange 31, (of which slots there are four, as will be seen by reference to Fig. 3.) To adjust the cutter radially for the purpose of taking a thicker or thinner chip, as may be desired, an adjusting-screw 32 is provided, having screw-threaded engagement with the stud 19, extending therethrough and one end thereof abutting against the rear face of the cutter 28. The screw 29 projects through a slot 33, and when it is desired to adjust the cutter the adjusting-screw 32 is turned in the proper direction, and the trimming-cutter 28 is finally clamped to the end of the cutter 32 by the clamp-screw 29. It is evident that the principal strain of cutting so far as the trimming-cutter is concerned is taken by the side walls of the slot 31, in which said trimming-cutter is located.

While I have shown and described my improved cutter as attached to a feed-table 13 without any attachment to adjust or feed said cutter transversely of the lathe-bed, it is evident that said cutter may be supported upon the well-known slide-rest of the ordinary lathe without departing from the spirit of my invention, and also while I have described my improved cutter as attached to a lathe (that being the cheapest and most obvious way of utilizing the invention) I do not wish to be limited to the use of said cutter with a lathe, as it is evident that the same may be used in combination with any rotary work-holder and table, with means for moving the table relatively to the work-holder and with means for clamping the cutter to said table.

The advantage of my improved cutter is that, if desired, the complete thread may be cut by one longitudinal feeding movement of the cutter and also that by its use comparatively unskilled labor may be employed to produce perfectly accurate work.

Having thus described my invention, what I claim, and desire by Letters Patent to secure, is—

1. An external-screw-thread cutter comprising in its construction a sleeve formed of a single piece of metal having upon its periphery a series of cutting-teeth extending longitudinally thereof, a cylindrical stud fast to and extending through said sleeve and beyond the opposite ends thereof, respectively, the projecting ends of said studs flattened for the purpose specified and the cutting edges of said teeth located at different distances from the median line of said stud.

2. An external-screw-thread cutter comprising in its construction a sleeve formed of a single piece of metal having upon its periphery a series of cutting-teeth extending longitudinally thereof, a cylindrical stud fast to and extending through said sleeve and beyond the opposite ends thereof, respectively, the projecting ends of said stud flattened and the cutting edges of said teeth located at different distances from the median line of said stud; in combination with a lathe having a feed-table provided with a slot and two tool-posts, each provided with a vertical slot through which the flattened ends of said stud, respectively, project, means to clamp said stud to said posts, and means to move said table longitudinally of said lathe.

3. An external-screw-thread cutter comprising in its construction a sleeve formed of a single piece of metal having upon its periphery a series of cutting-teeth, extending longitudinally thereof, a cylindrical stud fast to and extending through said sleeve and beyond the opposite ends thereof, respectively, the projecting ends of said stud flattened and the cutting edges of said teeth located at different distances from the median line of said stud; in combination with a lathe having a feed-table provided with a slot and two tool-posts, each provided with a vertical slot through which the flattened ends of said stud, respectively, project, means to clamp said stud to said posts, means to raise and lower said flattened ends in said vertical slots, and means to move said table longitudinally of said lathe.

4. An external-screw-thread cutter comprising in its construction a sleeve formed of a single piece of metal having upon its periphery a series of cutting-teeth extending longitudinally thereof, a cylindrical stud fast to and extending through said sleeve and beyond the opposite ends thereof, respectively, the projecting ends of said stud flattened for the purpose specified and the cutting edges of said teeth located at different distances from the median line of said stud, and a trimming-cutter fast to said sleeve in a slot extending transversely and at one end thereof.

5. An external-screw-thread cutter comprising in its construction a sleeve formed of a single piece of metal having upon its periphery a series of cutting-teeth extending longitudinally thereof, a cylindrical stud fast to and extending through said sleeve and beyond the opposite ends thereof, respectively, the projecting ends of said stud flattened for the purpose specified and the cutting edges of said teeth located at different distances from the median line of said stud, a trimming-cutter fast to said sleeve in a slot extending transversely and at one end thereof, and an adjusting-screw extending transversely through said stud and adapted to bear against the inner end of said trimming-cutter.

In testimony whereof I have hereunto set my hand in presence of two subscribing witnesses.

JAMES F. MALONEY.

Witnesses:
JOHN HALVORSEN,
GEORGE J. SMITH.